July 8, 1941.  E. R. JACOBI  2,248,708

RIM

Filed May 8, 1939  2 Sheets-Sheet 1

INVENTOR.
EMIL R. JACOBI
BY
ATTORNEYS

July 8, 1941.  E. R. JACOBI  2,248,708
RIM
Filed May 8, 1939  2 Sheets-Sheet 2

INVENTOR.
EMIL R. JACOBI
BY
ATTORNEYS

Patented July 8, 1941

2,248,708

UNITED STATES PATENT OFFICE 2,248,708

RIM

Emil R. Jacobi, Detroit, Mich., assignor to Kelsey-Hayes Wheel Company, Detroit, Mich., a corporation of Delaware Application May 8, 1939, Serial No. 272,530

2 Claims. (Cl. 152—411)

The invention relates to rims and refers more particularly to tire carrying wheel rims of that type having an endless rim base and a detachable endless tire retaining flange.

The invention has for one of its objects to provide an improved rim which provides for easier assembly of the flange with the rim base than present day constructions of the same general type. The invention has for another object the provision of an improved flange provided with means for automatically positioning the flange on the base in operative relation when the flange is being forced forwardly on the base by the tire while being inflated.

These and other objects of the invention will become apparent from the following description, taken in connection with the accompanying drawings, in which Figure 1 is a front elevation of a rim embodying my invention;

Figure 1:
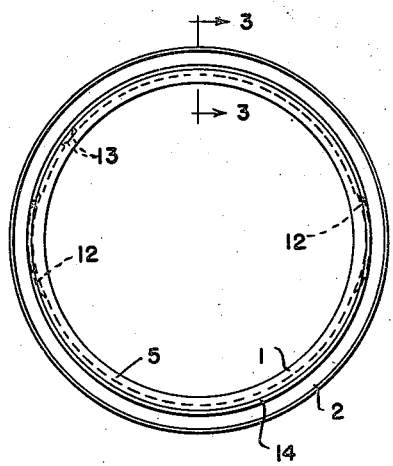
Figure 2:
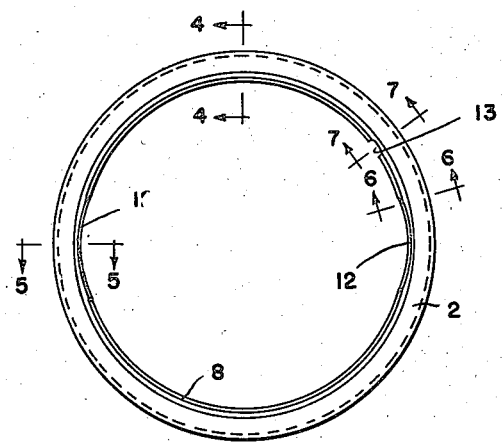
Figure 2 is a rear elevation of the tire retaining flange.
Figure 3:
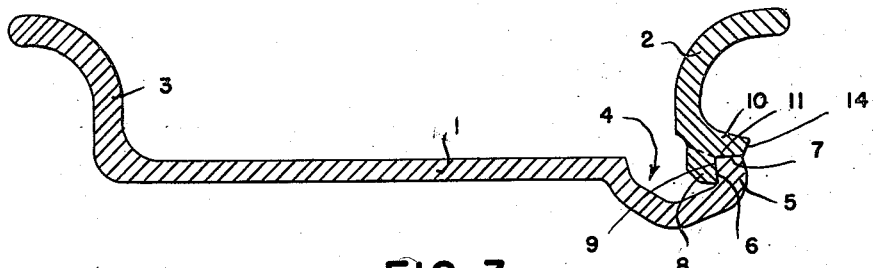
Figure 3 is an enlarged cross section on the line 3—3 of Figure 1.
Figure 4:
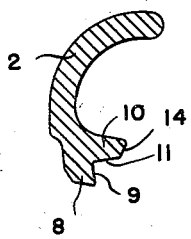
Figure 8:
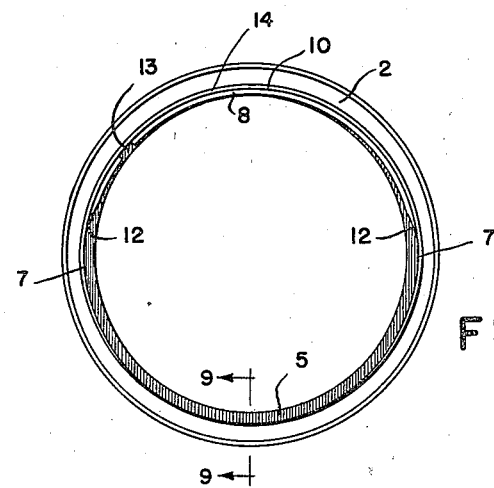
Figure 9:
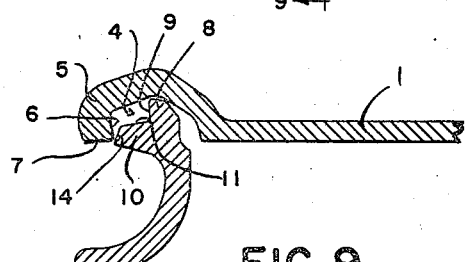

Figures 4, 5, 6 and 7 are enlarged cross sections on the lines 4—4, 5—5, 6—6 and 7—7, respectively, of Figure 2;

Figure 8 is a front elevation illustrating the position of the rim base and tire retaining flange during assembly of the latter on the former;

Figure 9 is an enlarged cross section on the line 9—9 of Figure 8.

The rim comprises the rim base 1 and the detachable tire retaining flange 2. The rim base has at one edge the tire retaining flange 3 and at the other edge the gutter 4, the latter forming retaining means for cooperating with retaining means upon the detachable flange for holding the latter in place on the rim base. The metal of the gutter preferably increases in thickness outwardly from the bottom of the gutter to its periphery and the outer wall 5 of the gutter is preferably inclined radially outwardly and rearwardly to provide the inclined inner face 6. The periphery provides the face 7 which is slightly inclined radially outwardly and forwardly.

The tire retaining flange is provided with the base portion 8 which has the outer face 9 for engaging the inner face 6 of the outer wall. The flange also has the annular forwardly extending lateral portion 10 having the inner face 11 for engaging the peripheral face 7 of the outer wall. Both the faces 9 and 11 are preferably arranged at the same angle as the faces 6 and 7, respectively.

Figure 5:
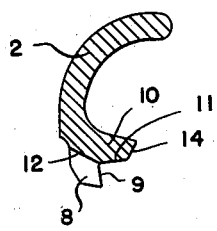
Figure 6:
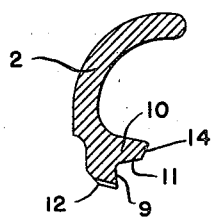
Figure 7:
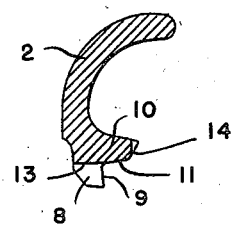

The internal diameter of the base portion 8 of the flange, as illustrated, is less than the distance from the bottom of the gutter 4 to the diametrically opposite part of the peripheral face 7 of the outer wall of the gutter. To enable assembly of the flange with the rim base, the base portion of the flange is formed with the diametrically opposite peripherally extending notches 12 and also with the notch 13 adjacent to, but spaced from, one of the notches 12 and adapted to receive a suitable prying tool. To facilitate assembly and to enable the use of large rims of this type, the bottoms of the notches 12 are beveled to be inclined radially outwardly and rearwardly from the junction of the faces 9 and 11. The inclination of the bottoms at the ends of the notches preferably progressively increases from the ends toward the middles for a short distance and then the inclination is substantially constant through the remaining extent of the notches. Figure 6 illustrates the inclination at one zone of the ends and Figure 5 illustrates the inclination through the remaining extent, it being noted that this latter inclination is approximately 25 degrees. The tool receiving notch 13, as illustrated in Figure 7, has a bottom extending substantially in line with the face 11.

To automatically position the tire retaining flange on the rim base when pressure is exerted in a forward direction on the flange by means of the tire (not shown) when inflated, the front face 14 of the lateral portion 10 of the flange is beveled to extend radially outwardly and forwardly. This face is engageable with the outer wall 5 of the gutter at the junction between the faces 6 and 7 when the lateral portion 10 is in the gutter to compel the flange to ride outwardly over the outer wall of the gutter when the flange is being forced forwardly.

The manner of assembling the tire retaining flange 2 upon the rim base 1 is illustrated in Figures 8 and 9. The flange is initially assembled with the rim base at an angle to the rim base and with the bottoms of the notches 12 engaging the peripheral face 7 and the part of the base portion 8 midway between the notches and overlapping the rim base located in the groove 4, as illustrated in Figure 9. By reason of the inclination of the bottoms of the notches 12, the angle between the flange and rim base is relatively small. The next step in the assembly is that of inserting a prying tool through the notch 13 and behind the outer wall of the gutter and prying the adjacent part of the base portion over the outer wall of the gutter, this being accomplished by stretching or distorting the flange out of its normal circular form. After this part, including all of that between the notch 13 and the adjacent notch 12, is located in the gutter, the remainder of the base portion of the flange may be readily moved into the gutter by prying successive parts over the outer wall of the gutter. It will be noted that, as shown in Figure 9, the beveled front face 14 either engages, or is in position to engage, the junction of the outer wall of the gutter between the faces 6 and 7. As a result, when the tire (not shown) is inflated and exerts a forward pressure upon the flange the beveled front face automatically compels the flange to assume its proper operative position upon the rim base.

To remove the tire retaining flange from the rim base, the tire (not shown) is first deflated, after which the prying tool is inserted into the notch 13 over the outer wall of the gutter and the parts of the base portion of the flange are successively pried over the outer wall.

From the above description, it will be seen that the diametrically opposite notches form reliefs for facilitating the assembly and removal of the tire retaining flange. Also that the beveled bottoms of these notches materially increase the ease of assembly and removal, enabling the practical use of large rims in which the internal diameter of the detachable tire retaining flanges is less than the distance from the bottom of the gutter to the diametrically opposite part of the periphery of the outer wall of the gutter. Further, that the flange has a front beveled face for automatically positioning or centering the flange on the rim base, thereby eliminating the necessity of a special construction of gutter.

What I claim as my invention is:

1. A wheel rim, comprising an endless rim base having a wall and a detachable endless tire retaining flange having an internal diameter less than the external diameter of the wall, the flange being provided with a forwardly extending lateral portion radially outwardly of and engaging the periphery of the wall and the lateral portion having a front beveled face adapted to engage and ride over the wall when the flange is being moved forwardly relative to the base to thereby position the former on the latter.

2. A wheel rim, comprising an endless rim base provided at one edge with an annular gutter having a generally radial outer wall and a detachable endless tire retaining flange mountable on the rim base and provided with a generally radially inwardly extending base portion normally extending into the gutter and having a lateral bearing against the outer wall, the peripheral edge of the outer wall affording a radial seat for said flange, said flange being provided with a forwardly extending lateral portion adapted to seat upon the peripheral edge seat of the outer wall, the lateral portion having a beveled front face adapted to slidably engage and ride over the outer wall whereby upon lateral pressure being exerted upon the tire retaining flange the latter may be guided to a position with the base portion laterally against the outer wall and the lateral portion seated radially on the outer wall.

EMIL R. JACOBI.